United States Patent Office 3,336,747
Patented Aug. 22, 1967

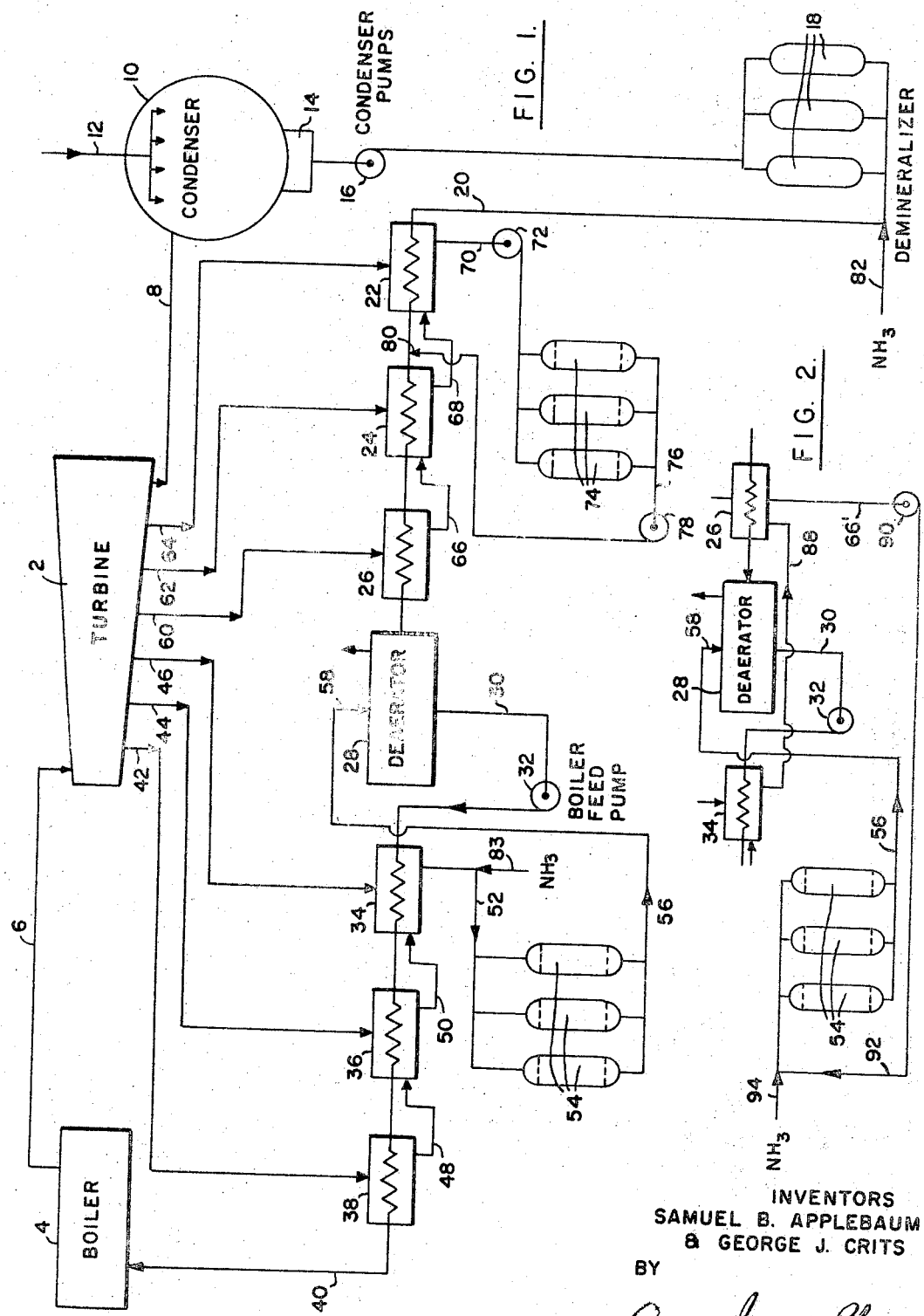

3,336,747
STEAM POWER PLANT
Samuel B. Applebaum, Philadelphia, and George J. Crits, Havertown, Pa., assignors to Crane Co., Chicago, Ill., a corporation of Illinois
Filed Sept. 28, 1965, Ser. No. 490,869
20 Claims. (Cl. 60—64)

ABSTRACT OF THE DISCLOSURE

A steam turbine power plant including a boiler, a turbine and a condenser has, between the condenser and boiler, a deaerator and a heat exchanger with the steam chamber of the heat exchanger connected to a high pressure extraction point of the turbine. Cation exchange-filtering means receives drainage from the heat exchanger to remove both suspended solids and heavy metal cations. The cation exchange-filtering means comprises a cation exchange resin in its ammoniated form, and the effluent from the cation exchange-filtering means is delivered to the deaerator. The resin may be a methacrylate carboxylic acid type resin.

---

This invention relates to steam power plants and has particular reference to the removal of corrosion products appearing in the system.

This application is in part a continuation of our application Ser. No. 460,079, filed June 1, 1965, now abandoned.

Steam turbines must be protected against corrosion products such os oxides of iron and copper which are carried by the steam generated in a boiler. Primary sources of such corrosion products are the feedwater heaters utilizing extraction steam. The use of steel heating coils in the heaters instead of copper alloy coils has reduced troubles, but iron oxide in solid and filterable form appears in the water, as does also some iron in solution.

The major corrosion apparently is on the steam side of the heaters where the extraction steam is being condensed. The corrosion is promoted by the high temperatures involved and troubles primarily arise from this in the high pressure heaters.

The general object of the invention is to make practical in a system involving extraction heaters the use of cation exchange resins functioning both as filters and ion exchangers. If the entire amount of water recirculating in a power plant is filtered and subject to cation exchange, the concentrations of the cation to be removed (iron) and its oxide to be filtered are too low, particularly for the filtration operation. The filtration becomes more effective as the concentration rises, and in accordance with the invention a relatively minor proportion of the circulated water (typically around 15%) is subjected to filtration and ion exchange. In brief, the action is limited to the treatment of water which is passing from the heat exchangers as steam condensate.

Other objects of the invention have to do with the securing of higher thermal efficiency and may be best made clear by giving consideration to a typical power plant embodying the invention as illustrated in the accompanying drawing in which:

FIGURE 1 is a flow diagram illustrating a typical system of a preferred type; and FIGURE 2 is a partial flow diagram illustrating a modification of FIGURE 1.

It is to be understood that the diagram is simplified in the sense that there are illustrated only the primary elements and connections of a power plant which are significantly tied up with the present invention. Such power plants are generally quite complex involving auxiliary fluid flows and utilizations, numerous auxiliaries, etc., to which reference need not be made herein since they are not directly concerned with the invention.

The power plant illustrated comprises a multiple stage steam turbine 2 shown in conventionalized form and which may comprise a number of individual sections considered herein as providing a single turbine unit. Steam is supplied to the turbine from boiler 4 through connection 6 to the highest pressure stage, ultimate exhaust of steam taking place from the discharge of the lowest pressure stage through connection 8 to a condenser 10 which may be of any of numerous forms. Makeup to the system may be provided through connection 12, the entering water aiding in condensation of the exhaust steam. From the hot well 14 of this condenser the condensate is removed by the usual condenser pumps conventionalized as a single pump 16. In a typical system the condenser pumps deliver the condensate (including makeup) to demineralizers conventionalized at 18 and of either usual type or, desirably, of the special type and utilized in special fashion as described in our application Ser. No. 411,241, filed Nov. 16, 1964. A plurality of demineralizer units is illustrated to provide for the usual continued operation of the demineralizing action as they are, in sequence, regenerated. These demineralizers remove both cations and anions, among these the iron or other metallic cations originating from corrosion. In the new system, however, these demineralizers do not have the burden of removing corrosion products from the steam side of the heater coils because the heater drains amounting to about 15% of the feedwater, are treated by the proposed cation exchange column. Also, the demineralizers in the new system are smaller because they do not have to treat these heater drains.

The demineralized water passes through connections 20 to the heating coils within the low pressure extraction heaters 22, 24 and 26, the flow being in series through these coils and into a conventional deaerator 28. More detailed reference to these heat exchangers will be made hereafter in considering their steam connections.

From the deaerator the main flow is from its outlet 30 to the boiler feed pump or pumps conventionalized at 32 which provide flow through the series arrangement of the heating coils in the high pressure extraction heaters 34, 36 and 38, with the ultimate delivery of the water to the boiler 4. What has been described is the main flow of water in the plant.

High pressure extraction points from the turbine 2 are indicated in sequence, beginning with the highest pressure extraction point, at 42, 44 and 46. It will be understood that the showing of three of these (as also three low pressure extraction points) is merely illustrative, since less or more extraction points may be involved in each group communicating with corresponding heat exchangers. In the present instance the exchangers 38, 36 and 34 respectively receive steam from the extraction points 42, 44 and 46. The steam spaces of these exchangers have the usual drains cascaded as indicated at 48 and 50 with flow taking place to the regions of successively lower pressure conditions.

In accordance with the present invention the drain 52 from the last high pressure exchanger 34 delivers the condensed steam to cation exchange-filter units 54, shown as three in number such as would normally be used to maintain action of two of them while one was being regenerated.

The on-stream flow from the units 54 passes through connection 56 to the entrance point 58 of the deaerator 28 where the treated water joins the main flow for delivery at 30. As will be more fully discussed hereafter, the units 54 may operate at high temperature so that their effluent provides heating in the deaerator.

The low pressure extraction points 60, 62 and 64 supply extraction steam to the respective heat exchangers 26, 24 and 22. Condensation occurs in these heat exchangers, and like the high pressure exchangers, they have the cascaded drain arrangement indicated at 66 and 68 leading condensate from one heater to the next having a lower pressure. From the last heater 22 of the cascaded drainage system the condensate passes at 70 to a pump 72 suitable to provide flow through the cation exchange filter units 74 similar to the units 54. From these flow takes place at 76 and the treated condensate is pumped by the pump 78 to a convenient point in the system which is usually such as indicated at 80, i.e., to a connection carrying the main flow and located between the first two heat exchangers 22 and 24, as viewed in the main flow system. The temperature of the effluent at 76 will generally be relatively low so that it should be heated prior to entrance into the deaerator 28.

As already noted, the units 54 and 74 are similar in nature, and in one form of the invention may comprise a sodium-type cation exchange resin which may be regenerated by sodium chloride and is capable of removing heavier metal cations from solution, such cations resulting from corrosion. The cation exchange resin so used is capable of operating at high temperatures of the order of 300° F. or more. Its particulate form is such that its bed also acts as a filter capable of removing even fine solid particles of metal oxides or such other solids as may appear in the final drains from the heat exchange groups.

While various resins suitable for this use are on the market, and have been used in units capable of both cation exchange and filtration, advantageous resins are of the divinyl benzene-styrene sulfonic acid type used in the sodium salt form. Such resins are manufactured by Rohm & Haas Company under the designations Amberlite 120 and Amberlite 200. The sodium form operates at temperatures up to around 300° F. For the purpose of adequate filtration, the pellets of this resin may be in the 20–50 mesh range, averaging approximately 30 mesh. Cleaning to remove the filtered out solids may be effected by backwashing either with or without air scrubbing.

As will be pointed out more fully the ammoniated form of this type of resin may be preferred for use and in such case regeneration is effected by sulfuric acid, hydrochloric acid, or other acids to produce the hydrogen form of the resin after which ammoniation may be effected by the introduction of ammonia into the resin. Instead of ammonia, aliphatic amines may be used to substitute for the hydrogen resulting from acid regeneration.

Even better than the sulfonic acid type resins just mentioned are methacrylate carboxylic acid type resins of the type marketed by Diamond Alkali as Duolite ES–101 and by Rohm & Haas Company as Amberlite IRC–50. This type of resin withstands temperatures of the order of 370° F. and may be used in the hydrogen form or, and preferably, in a partially ammoniated form (80% or more in the hydrogen form). Aliphatic amines may also be used instead of ammonia. Regeneration may be effected by acids as already described, followed by treatment with ammonia or by aliphatic amines, if desired. Pellets may have the mesh sizes above mentioned.

Also usable in the same fashion are the Diamond Alkali acrylic base carboxylic acid type resins such as Alkali's resin ES–80 and Rohm & Haas Company's resin Amberlite IRC–84. Various phenol-formaldehyde carboxylic acid type resins may also be used up to the limits of temperature which they will withstand.

While regeneration of the resins has been referred to, because of the relatively light burdens imposed on the resins in effecting ion exchange in accordance with the invention they may be used in relatively shallow beds (without affecting their filtration actions) over such extended periods that they may be economically discarded after use, eliminating the costs of regeneration.

It will be understood that valve connections of conventional types are provided above and below the resin beds for regeneration, backwashing, scrubbing and rinsing. The solid material which accumulates by reason of filtering action, being fine in form, is removed by backwashing and scrubbing, though alternatively the regeneration and cleaning cycle may involve the extraction of the bed in suspension in liquid to a separate cleaning vessel, with provision for return in flowing water to its original position in its housing.

When the cation exchange resin is used in its sodium form, sodium will be liberated and this will pass to the boiler. What passes through the system to the condenser by entrainment in the steam will be removed by the demineralizer. But it is more desirable to use an ammoniated hydrogen cation resin, and this ties in well with the utilization of such a cation exchange resin in the demineralizers 18 as set forth in our prior application referred to above. Ammonia may be introduced into the system at 82 and/or 83 to maintain a desired content of ammonia throughout the system and including the units 54 and 74. Hydrazine may also be added with the ammonia, or may be used instead of ammonia with similar effect.

$NH_3$ feed point 83, ahead of the cation exchange columns 54 has a particular advantage because it decreases the tendency for hydrolyzation of the $NH_3$ off the resin. This tendency increases with the heater drain temperature. When this temperature exceeds about 300° F., this hydrolyzation will be counteracted by the increased $NH_3$ in the influent of these cation exchange columns. The use of this $NH_3$ feed point 83 will, therefore, permit treating heater drains of higher temperature than 300° F., resulting in greater thermodynamic efficiency.

Through the use of the ammoniated resin, only volatile products pass from the cation exchange units, eliminating the possibility of sodium accumulation in the boiler and turbine.

From the foregoing it will be seen that the cation exchange-filter units are required to handle only a minor proportion of the main stream, typically around 15%. Not only does this greatly lessen the size of piping required and size of the ion exchange units, but more effective filtration operation results when the material to be filtered is in more concentrated suspension.

A further advantage is gained by returning the drainage from the high pressure exchangers to the deaerator rather than continuing the cascade drainage arrangement through the low pressure heat exchangers. The heat of the condensate is utilized in the deaerator, whereas if the drainage from the high pressure heat exchangers was led to the low pressure heat exchangers flashing into steam would ordinarily occur not only requiring much larger piping but wasting energy. This wastage of energy would occur by reason of the fact that the flashed steam would take the place of extracted steam from the low pressure stages of the turbine. Reduction of the amount of extracted steam would mean that more steam would go to the condenser where its heat would be lost in the condenser cooling water.

Both thermodynamic and mechanical advantages are thus secured.

If a high pressure heater drain such as 34 operates at too high a temperature, it may not be acceptable to feed therefrom an ammoniated cation resin unit such as 54 in the fashion illustrated in FIGURE 1. In such case an alternative system may be used such as illustrated in FIGURE 2 wherein certain of the parts shown in FIGURE 1 are repeated to illustrate modification. In FIGURE 2 the drainage from the heater 34 does not pass to the cation resin columns 54 but rather flows through connection 88 to the heater 26 from which it passes along with condensate from this heater through connection 66' to be forced by pump 90 through connection 92 to the ammoniated cation resin units 54. From these the effluent flows as previously described through connection 56 to the deaerator. Ammonia may be introduced at 94 to correspond to the introduction at 83 in FIGURE 1. In this arrangement the heater 26 is not cascaded with the heaters 24 and 22.

It will be evident that various changes in details may be made without departing from the invention as defined in the following claims.

What is claimed is:

1. In combination, a steam generator, a turbine connected to receive driving steam from said generator, a condenser connected to the turbine to receive exhaust steam therefrom, means connecting the condenser and boiler for return of condensate to provide feedwater to the boiler, said means including a plurality of heat exchangers arranged in series with respect to the return flow of condensate, means connecting steam chambers of said heat exchangers to individual extraction points of the turbine to receive steam therefrom, means connecting drains of said steam chambers in series, cation exchange-filtering means receiving the total drainage from the heat exchangers to remove from the drainage both suspended solids and heavy metal cations, and means directing the effluent from said cation exchange-filtering means to said means for return of condensate.

2. The combination according to claim 1 in which the cation exchange-filtering means is a carboxylic acid type resin.

3. The combination according to claim 1 in which the cation exchange-filtering means is a methacrylate carboxylic acid type resin.

4. In combination, a steam generator, a turbine connected to receive driving steam from said generator, a condenser connected to the turbine to receive exhaust steam therefrom, means connecting the condenser and boiler for return of condensate to provide feedwater to the boiler, said means including a deaerator and a plurality of heat exchangers arranged in series with respect to the return flow of condensate, means connecting steam chambers of said heat exchangers to individual extraction points of the turbine to receive steam therefrom, means connecting drains of said steam chambers in series, cation exchange-filtering means receiving the total drainage from the heat exchangers to remove from the drainage both suspended solids and heavy metal cations, and means directing the effluent from said cation exchange-filtering means to said deaerator.

5. In combination, a steam generator, a turbine connected to receive driving steam from said generator, a condenser connected to the turbine to receive exhaust steam therefrom, means connecting the condenser and boiler for return of condensate to provide feedwater to the boiler, said means including at least one heat exchanger, means connecting the steam chamber of said heat exchanger to a high pressure extraction point of the turbine to receive steam therefrom, cation exchange-filtering means receiving drainage from the steam chamber of said heat exchanger to remove from the drainage both suspended solids and heavy metal cations and means directing the effluent from said cation exchange-filtering means to said means for return of condensate.

6. The combination according to claim 5 in which the cation exchange-filtering means is a carboxylic acid type resin.

7. The combination according to claim 5 in which the cation exchange-filtering means is a methacrylate carboxylic acid type resin.

8. In combination, a steam generator, a turbine connected to receive driving steam from said generator, a condenser connected to the turbine to receive exhaust steam therefrom, means connecting the condenser and boiler for return of condensate to provide feedwater to the boiler, said means including a deaerator and at least one heat exchanger, means connecting the steam chamber of said heat exchanger to a high pressure extraction point of the turbine to receive steam therefrom, cation exchange-filtering means receiving drainage from the steam chamber of said heat exchanger to remove from the drainage both suspended solids and heavy metal cations and means directing the effluent from said cation exchange-filtering means to said deaerator.

9. In combination, a steam generator, a turbine connected to receive driving steam from said generator, a condenser connected to the turbine to receive exhaust steam therefrom, means connecting the condenser and boiler for return of condensate to provide feedwater to the boiler, said means including a plurality of heat exchangers arranged in series with respect to the return flow of condensate, means connecting steam chambers of said heat exchangers to individual extraction points of the turbine to receive steam therefrom, means connecting drains of said steam chambers in series, cation exchange-filtering means receiving the total drainage from the heat exchangers to remove from the drainage both suspended solids and heavy metal cations, the last mentioned means comprising a cation exchange resin in its ammoniated form, and means directing the effluent from said cation exchange-filtering means to said means for return of condensate.

10. The combination according to claim 9 in which the cation exchange-filtering means is a carboxylic acid type resin.

11. The combination according to claim 9 in which the cation exchange-filtering means is a methacrylate carboxylic acid type resin.

12. In combination, a steam generator, a turbine connected to receive driving steam from said generator, a condenser connected to the turbine to receive exhaust steam therefrom, means connecting the condenser and boiler for return of condensate to provide feedwater to the boiler, said means including a deaerator and a plurality of heat exchangers arranged in series with respect to the return flow of condensate, means connecting steam chambers of said heat exchangers to individual extraction points of the turbine to receive steam therefrom, means connecting drains of said steam chambers in series, cation exchange-filtering means receiving the total drainage from the heat exchangers to remove from the drainage both suspended solids and heavy metal cations, the last mentioned means comprising a cation exchange resin in its ammoniated form, and means directing the effluent from said cation exchange-filtering means to said deaerator.

13. In combination, a steam generator, a turbine connected to receive driving steam from said generator, a condenser connected to the turbine to receive exhaust steam therefrom, means connecting the condenser and boiler for return of condensate to provide feedwater to the boiler, said means including at least one heat exchanger, means connecting the steam chamber of said heat exchanger to a high pressure extraction point of the turbine to receive steam therefrom, cation exchange-filtering means receiving drainage from the steam chamber of said heat exchanger to remove from the drainage both suspended solids and heavy metal cations, the last mentioned means comprising a cation exchange resin in its ammoniated form, and means directing the effluent from said cation exchange-filtering means to said means for return of condensate.

14. The combination according to claim 13 in which the cation exhange-filtering means is a carboxylic acid type resin.

15. The combination according to claim 13 in which the cation exchange-filtering means is a methacrylate carboxylic acid type resin.

16. In combination, a steam generator, a turbine connected to receive driving steam from said generator, a condenser connected to the turbine to receive exhaust steam therefrom, means connecting the condenser and boiler for return of condensate to provide feedwater to the boiler, said means including a deaerator and at least one heat exchanger, means connecting the steam chamber of said heat exchanger to a high pressure extraction point of the turbine to receive steam therefrom, cation exchange-filtering means receiving drainage from the steam chamber of said heat exchanger to remove from the drainage both suspended solids and heavy metal cations, the last mentioned means comprising a cation exchange resin in its ammoniated form, and means directing the effluent from said cation exchange-filtering means to said deaerator.

17. In combination, a steam generator, a turbine connected to receive driving steam from said generator, a condenser connected to the turbine to receive exhaust steam therefrom, means connecting the condenser and boiler for return of condensate to provide feedwater to the boiler, said means including at least one heat exchanger, means connecting the steam chamber of said heat exchanger to a high pressure extraction point of the turbine to receive steam therefrom, cation exchanger-filtering means receiving drainage from the steam chamber of said heat exchanger to remove from the drainage both suspended solids and heavy metal cations, the last mentioned means comprising a cation exchange resin in its ammoniated form, means for introducing ammonia directly to said cation exchange resin, and means directing the effluent from said cation exchange-filtering means to said means for return of condensate.

18. The combination according to claim 17 in which the cation exchange-filtering means is a carboxylic acid type resin.

19. The combination according to claim 17 in which the cation exchange-filtering means is a methacrylate carboxylic acid type resin.

20. In combination, a steam generator, a turbine connected to receive driving steam from said generator, a condenser connected to the turbine to receive exhaust steam therefrom, means connecting the condenser and boiler for return of condensate to provide feedwater to the boiler, said means including a deaerator and at least one heat exchanger, means connecting the steam chamber of said heat exchanger to a high pressure extraction point of the turbine to receive steam therefrom, cation exchange-filtering means receiving drainage from the steam chamber of said heat exchanger to remove from the drainage both suspended solids and heavy metal cations, the last mentioned means comprising a cation exchange resin in its ammoniated form, means for introducing ammonia directly to said cation exchange resin, and means directing the effluent from said cation exchange-filtering means to said deaerator.

References Cited

UNITED STATES PATENTS 2,373,549   4/1945   D'Alelio _____ 210—38

MARTIN P. SCHWADRON, *Primary Examiner.*

R. R. BUNEVICH, *Assistant Examiner.*